(12) United States Patent
Fribourg (10) Patent No.: US 10,239,796 B2
(45) Date of Patent: Mar. 26, 2019

(54) TOOLING FOR USE DURING HEAT TREATMENT TO SUPPORT A PREFORM MADE OF POWDER

(71) Applicant: Safran Aircraft Engines, Paris (FR)

(72) Inventor: Guillaume Fribourg, Puteaux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 202 days.

(21) Appl. No.: 15/202,971

(22) Filed: Jul. 6, 2016

(65) Prior Publication Data
US 2017/0008809 A1 Jan. 12, 2017

(30) Foreign Application Priority Data

Jul. 6, 2015 (FR) ...................................... 15 56373
Jul. 6, 2015 (FR) ...................................... 15 56376

(51) Int. Cl.
*C04B 37/00* (2006.01)

(52) U.S. Cl.
CPC .......... *C04B 37/005* (2013.01); *C04B 37/001* (2013.01); *C04B 2235/9615* (2013.01);
(Continued)

(58) Field of Classification Search
CPC ................ C04B 37/005; C04B 37/001; C04B 2237/368; C04B 2237/348;
(Continued)

(56) References Cited

U.S. PATENT DOCUMENTS 1,342,041 A * 6/1920 Drinker ................. F27B 9/2469
432/241
3,904,352 A * 9/1975 Thurnauer ............... B65G 7/04
264/671
(Continued)

FOREIGN PATENT DOCUMENTS

EP 3 081 322 A1 10/2016
FR 3 012 757 A1 5/2015
(Continued)

OTHER PUBLICATIONS

French Preliminary Search Report dated May 6, 2016 in French Application 15 56373, filed Jul. 6, 2015 (with English Translation of Categories of Cited Documents).
(Continued)

*Primary Examiner* — Nahida Sultana
(74) *Attorney, Agent, or Firm* — Oblon, McClelland, Maier & Neustadt, L.L.P.

(57) ABSTRACT

The invention provides tooling (100) for acting during heat treatment to support a preform (110) of a three-dimensional part obtained by shaping a metal or ceramic powder, the preform presenting at least one bearing surface (112) on which it can rest and at least one suspended surface (111) that is suspended relative to the bearing surface, the tooling comprising a tray (120), and a plurality of blocks (130) arranged on the tray and each having at least one surface (130*a*) for supporting the preform, the blocks being suitable for moving relative to one another by sliding on the tray between a first position in which the blocks are spaced apart from one another and together define a first volume, and a second position in which the blocks together define a second volume that is smaller than the first volume. The invention also provides a method of heat treating a preform made of powder and using such tooling.

9 Claims, 9 Drawing Sheets

(52) U.S. Cl.
CPC .. *C04B 2237/064* (2013.01); *C04B 2237/066* (2013.01); *C04B 2237/34* (2013.01); *C04B 2237/341* (2013.01); *C04B 2237/343* (2013.01); *C04B 2237/348* (2013.01); *C04B 2237/368* (2013.01); *C04B 2237/84* (2013.01)

(58) Field of Classification Search
CPC .......... C04B 2237/343; C04B 2237/84; C04B 2237/34; C04B 2237/006; C04B 2237/064; C04B 2235/9615; C04B 2237/341
See application file for complete search history.

(56) References Cited

U.S. PATENT DOCUMENTS

| | | | | |
|---|---|---|---|---|
| 4,399,089 | A * | 8/1983 | Mohri | C04B 41/009 264/132 |
| 4,424,022 | A * | 1/1984 | Herrold | F27D 5/00 432/5 |
| 9,169,162 | B2 * | 10/2015 | Rhoads | C03B 17/064 |
| 9,184,071 | B2 * | 11/2015 | Ogura | H01L 21/67173 |
| 2004/0159985 | A1 | 8/2004 | Altoonian et al. | |
| 2008/0237428 | A1 * | 10/2008 | Kobayashi | C04B 35/565 248/346.06 |
| 2008/0251979 | A1 * | 10/2008 | Louesdon | B22C 9/105 264/669 |
| 2010/0210444 | A1 * | 8/2010 | Rhoads | C03B 17/064 501/106 |
| 2012/0133088 | A1 | 5/2012 | Rhoads | |
| 2013/0082416 | A1 * | 4/2013 | Wakeman | B29C 33/14 264/259 |
| 2013/0116851 | A1 * | 5/2013 | Sasaki | G05B 19/404 700/299 |

FOREIGN PATENT DOCUMENTS

| | | |
|---|---|---|
| JP | 2-80375 A | 3/1990 |
| JP | 3-53005 A | 3/1991 |
| JP | 8-41505 | 2/1996 |
| JP | 9-110535 A | 4/1997 |
| JP | 2008-184337 A | 8/2008 |
| WO | WO 2015/068100 A1 | 5/2015 |

OTHER PUBLICATIONS

French Preliminary Search Report dated May 9, 2016 in French Application 15 56376, filed Jul. 6, 2015 (with English Translation of Categories of Cited Documents).
Office Action dated Sep. 19, 2017 in British Patent Application GB1611783.0, 3 pages.

* cited by examiner

TOOLING FOR USE DURING HEAT TREATMENT TO SUPPORT A PREFORM MADE OF POWDER

BACKGROUND OF THE INVENTION

The present invention relates to the general field of applying heat treatment to preforms of parts that are made by shaping powders. The invention applies more particularly, but not exclusively, to sintering preforms of three-dimensional parts that are obtained by shaping metal or ceramic powder.

It is nowadays common practice to use methods of fabricating three-dimensional parts out of metal (or metal alloy) or out of ceramic that involve a step of shaping a powder in order to obtain a preform (e.g. by using a powder or metal injection molding (PIM or MIM) technique with the help of a binder, e.g. an organic binder, or powder compaction molding), followed by a step of sintering the preform.

During the step of sintering the preform (or of applying heat treatment at high temperature), several thermomechanical phenomena occur:
- the material expands thermally, depending on the coefficient of thermal expansion of the material constituting the preform;
- the shrinkage due to the powder densifying during sintering (which may represent the preform contracting by about 15% in all directions), which depends on the initial density of the powder and on sintering parameters (e.g.: temperature, pressure, duration, final density desired for the part); and
- the part creeping or sagging under its own weight when the part presents a portion that is suspended (or, in other words, that is cantilevered-out).

With complex shapes, parts may present large cantilevered-out areas that sag during the sintering step of the preform if they are not completely rigid, and this should be avoided.

Document FR 2 944 721 discloses a method of fabricating a metal part by metal powder injection molding, in which:
- a mechanical support is made from a mixture of powder and binder shaped so as to support the blank along a contact surface;
- the blank is arranged on the mechanical support along the contact surface; and
- the assembly formed by the blank on the mechanical support is sintered simultaneously. The method described in that document serves to avoid creep in a part that presents a suspended surface. Nevertheless, the mechanical support described in that document can be used only once, since it is sintered at the same time as the part in order to accompany it and support it throughout the sintering step. The use of such a support increases considerably the quantity of powder that is needed, the cost, and the time for fabricating each part.

OBJECT AND SUMMARY OF THE INVENTION

A main object of the present invention is thus to mitigate such drawbacks by providing tooling for acting during heat treatment to support a preform of a three-dimensional part obtained by shaping a metal or ceramic powder, the preform presenting at least one bearing surface on which it can rest and at least one suspended surface that is suspended relative to the bearing surface, the tooling comprising a tray, and a plurality of blocks arranged on the tray and each having at least one surface for supporting the preform, the blocks being suitable for moving relative to one another by sliding on the tray between a first position in which the blocks are spaced apart from one another and together define a first volume, and a second position in which the blocks together define a second volume that is smaller than the first volume.

The tooling of the invention is remarkable firstly in that it is reusable and it can be used for fabricating a plurality of three-dimensional parts of the same shape in succession. Furthermore, each block has a surface that is to come into contact with the preform that generally lies at an angle in the range 0° to 90° relative to the support tray. For parts that have a surface that is suspended (or in other words cantilevered-out), such a support surface enables the preform to be supported during heat treatment, and thus avoid it creeping under its own weight. The blocks are also suitable for moving relative to one another by sliding on the sintering tray that supports them, so as to accompany the shrinkage of the preform during the heat treatment (the shrinkage of the part is generally uniform and isotropic). Specifically, the blocks may move between two positions:
- a first position in which the blocks are spaced apart from one another, defining a first volume that is large enough to support the preform before it is subjected to the heat treatment; and
- a second position in which the blocks have moved towards each other so as to define a second volume smaller than the first volume, the second volume being small enough to support the part after it has been subjected to shrinkage, if any, during the heat treatment, while avoiding subjecting it to stresses on contact with the tooling as a result of its shrinkage. The blocks are thus given a size so that the part is never subjected to stresses as a result of its shrinkage and such that it is held during the heat treatment so as to avoid creep.

The blocks may be moved on the tray by the preform itself as it shrinks during the heat treatment. No additional device is then needed to cause the blocks to move between the two above-specified positions, so the tooling can operate passively.

In a variant embodiment of the invention, the tooling may further include at least one drive element, said drive element connecting together at least some of the blocks and comprising a metal or ceramic powder mixed with an organic binder and suitable for shrinking under the effect of temperature so as to drive said at least some of the blocks to which it is connected in one or more directions corresponding to one or more shrinkage directions of each drive element.

In this variant, at least some of the movement of the preform may be due to the presence of drive elements comprising a mixture of powder and an organic binder. Such drive elements are subject to shrinkage corresponding to the powder present in the drive elements densifying under the effect of heat, thereby driving the blocks to which they are connected in their shrinkage direction. Thus, when a preform obtained by shaping powder is placed on tooling in this variant of the invention, the blocks move to accompany the shrinkage of the preform without imposing stresses thereon during its heat treatment.

In embodiments, the drive elements may comprise a rod provided with at least two abutments, and the blocks may have a channel passing therethrough in which the rod is arranged, the rod being configured so that the abutments bear against at least two blocks when the rod shrinks in order to drive them in the shrinkage direction of the rod. By way of example, the abutments may comprise shoulders.

In addition, the tooling may have at least two drive elements connected to at least some of the blocks, each of said drive elements extending in a different direction.

Preferably, the blocks are hollow, at least in part, thereby enabling their weight to be reduced and ensuring that they slide better on the tray that supports them.

Also preferably, each block includes a fillet formed on at least one of the edges of said block that comes into contact with the tray. This provision makes it possible to reduce the contact areas between the blocks and the tray, so as to further improve sliding.

Also preferably, the blocks are made of a ceramic material selected from the following materials: zirconia; alumina; yttria; silicon dioxide; and silicon nitride ($Si_3N_4$); a mixture of ceramics; or a metal alloy selected from the following alloys: a molybdenum-based alloy; a cobalt-based alloy; a nickel-based alloy; an iron-based alloy; a titanium-based alloy; and an aluminum-based alloy. The material forming the blocks is preferably selected to be compatible with the temperature of the heat treatment that is to be performed. In other words, the material is preferably selected so that it remains geometrically stable (or undeformable) at the temperature of the heat treatment (it may nevertheless be subjected to elastic deformation such as reversible thermal expansion).

Advantageously, the tooling further comprises a layer of alumina or yttrium oxide powder on the top surface of the tray. Preferably, the powder is made up of grains that are substantially spherical so that it flows as fluidly as possible, and the thickness of the layer lies in the range 10 micrometers (μm) to 500 μm. The layer does not react with the support tray or the tooling blocks, and it serves to ensure that the blocks slide more easily on the top surface of the tray supporting them.

Also advantageously, the tooling further comprises an anti-diffusion barrier based on yttrium oxide or on aluminum oxide on the surfaces of the blocks that are to support the preform. This layer avoids the preform reacting with the blocks, thus serving firstly to enable the blocks of the tooling to move on the tray, and secondly to make it easy to remove the part from the tooling once the heat treatment has terminated.

Also advantageously, the top surface of the tray is polished in order to minimize friction between the blocks and the tray, thereby facilitating sliding of the blocks.

In the same manner, the surfaces of the blocks in contact with the tray may likewise be polished or subjected to surface treatment in order to optimize the sliding of the blocks on the tray.

The invention also provides a method of heat treating a preform of a three-dimensional part obtained after shaping a metal or ceramic powder, the preform presenting at least one bearing surface on which it can rest and at least one suspended surface that is suspended relative to a bearing surface, the method comprising placing the preform on tooling as described above by positioning the preform over the blocks, and applying heat treatment to the preform.

Preferably, the blocks of the tooling are made out of the same powder as that constituting the preform, the blocks being sintered prior to the step of placing the preform on the tooling. In a variant, the blocks may be obtained by machining from solid, by molding, or by any other appropriate technique.

When present, the drive element may comprise a powder identical to the powder of the preform being subjected to heat treatment. As a result, the speed and the amplitude of the shrinkage of the preform and of the drive element are identical, and the preform is not subjected to any stress by the blocks of the tooling. In a variant, and depending on requirements, the powder (and/or the binder) of the drive element may be different in order to benefit from a shrinkage speed and/or a shrinkage amplitude that is different.

Prior to placing the preform on the tooling, the blocks are preferably spaced apart by a distance that is less than or equal to 10 millimeters (mm), and more preferably by a distance less than or equal to 5 mm. These values make it possible to avoid having too great a suspended surface area remaining during the heat treatment step and to ensure that the part does not suffer creep.

The invention also provides a method as described above, wherein the heat treatment of the preform is sintering the preform.

Finally, the invention also provides the above-described fabrication method, wherein the part to be fabricated is a part for aviation. The term "part for aviation" is used to mean a part that may be used in a turbojet for propelling an aircraft, e.g.: a vane of an aviation turbine engine, an injection system for an aviation combustion chamber, a component of an aviation injection system, a flange, a flange system, an engine equipment support, a cover.

BRIEF DESCRIPTION OF THE DRAWINGS

Other characteristics and advantages of the present invention appear from the following description given with reference to the accompanying drawings, which show embodiments having no limiting character. In the figures.

DETAILED DESCRIPTION OF THE INVENTION

The invention is described below in its application to sintering three-dimensional parts having at least one suspended surface (in other words a surface that is cantilevered out or not supported), that is supported relative to a bearing surface. The invention may nevertheless be applied to other methods of heat treatment at high temperature that can lead to thermomechanical deformation of the part.

Figure 1A:
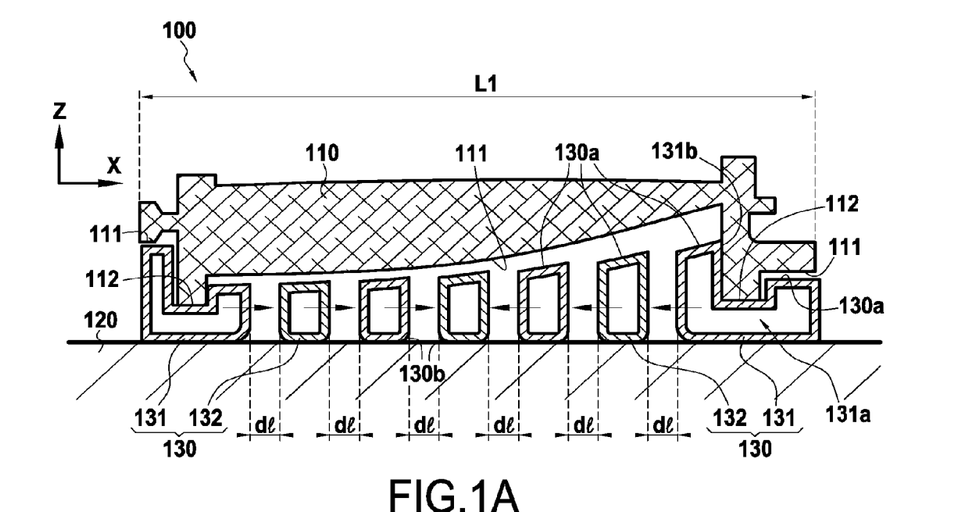
FIGS. 1A and 1B are section views of tooling in an embodiment of the invention, respectively in a first position before a sintering step and in a second position after a sintering step.
Figure 1B:
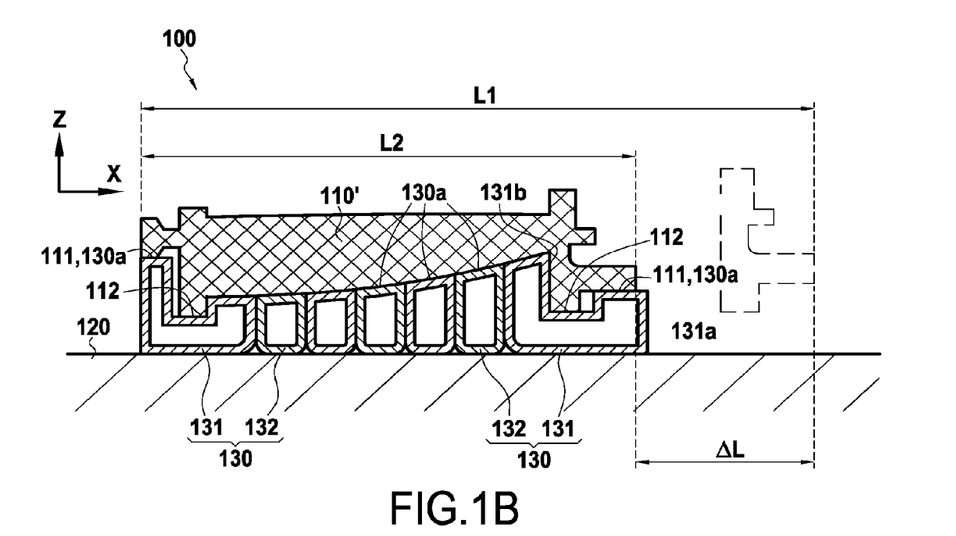

FIGS. 1A and 1B show a first embodiment of tooling 100 of the invention in a substantially one-dimensional configuration. The arrangement of the tooling 100 shown in FIG. 1A is that adopted prior to the sintering step beginning, whereas the configuration of FIG. 1B is that obtained after sintering has been performed.

FIG. 1A shows tooling 100 of the invention for supporting a vane preform 110. Once it has been sintered (FIG. 1B), the vane 110' may constitute a guide vane for an aviation turbine engine. In this example, the vane preform 110 has a plurality of suspended surfaces 111 that are suspended relative to two bearing surfaces 112 and presents a total length L1 in its longitudinal direction (along a horizontal axis X), the length L1 of the preform 110 being much greater than its width.

The vane preform 110 is previously made by a known technique of shaping powder. By way of example, mention may be made of the powder injection molding method that consists in preparing a composition comprising a powder (e.g. made of metal, metal alloy, or ceramic) and a binder (e.g. a thermoplastic resin) that is injected into a mold having the shape of the part that is to be fabricated and that is temperature regulated. Thereafter, the mold is allowed to cool in order to solidify the composition, and finally it is unmolded in order to obtain the preform 110 of the part to be fabricated. The resulting preform 110 may optionally have its binder eliminated (a step also known as "debinding") prior to being subjected to a sintering step.

In accordance with the invention, the tooling 100 comprises a horizontal tray 120 supporting a row of blocks 130 that are longitudinally distributed along the axis X, the row comprising two outer blocks 131 and five central blocks 132.

The blocks 130 are preferably not deformable. The term "not deformable" is used to mean that the structural properties of the blocks are conserved during the step of sintering the part, and that they do not suffer irreversible transformations (although they might suffer elastic deformations due to temperature). More particularly, the blocks are configured to withstand the conditions of the sintering step (temperature and pressure, in particular). In practice, the blocks 130 may be made of a material having a melting temperature that is higher than the temperature used during the heat treatment (e.g. the sintering dwell temperature).

By way of example, the tray 120 may be made of a material selected from the following materials: a ceramic (based on zirconium oxide, aluminum oxide, yttrium oxide, silicon dioxide, silicon nitride, or a mixture of these ceramics), or an alloy (based on molybdenum, cobalt, nickel, titanium, or aluminum).

The preform 110 is arranged over the blocks 130, and it rests with its bearing surfaces 112 in contact with the outer blocks 131 in grooves 131a formed therein. Each of the blocks 130 has at least one surface 130a for supporting the preform during sintering.

The blocks 130 may be of sizes and shapes that differ from one block to another, which sizes and shapes are adapted specifically as a function of the shape of the vane 110' (FIG. 1B) and as a function of the shrinkage to which its preform 110 is subjected during sintering (which can be anticipated by carrying out tests, for example). The blocks 130, which occupy a first position prior to sintering, together define a first volume.

The blocks 130 may be made out of the same powder as the powder used for making the preform 110, providing they have been sintered beforehand (so that they conserve their shape during the sintering step). In addition, they may be made of metal (e.g. of titanium), of metal alloy, or of ceramic (e.g. zirconia, alumina, or silicon dioxide), so long as they conserve their stiffness and their shape at least up to the temperature at which the part is sintered.

In this example, the blocks 130 are spaced apart by a certain distance d☐ for the purposes firstly of compensating shrinkage of the preform during sintering, and secondly for compensating the thermal expansion of the preform 110. It should be observed that the predominant thermomechanical phenomenon is shrinkage of the preform due to sintering, which may represent contraction that is uniform and isotropic in the dimensions of the preform by about 15%. The thermal expansion phenomenon may be taken into consideration in particular when the blocks 130 and the preform 110 are made of materials of different kinds, and more precisely materials that do not expand in the same manner when subjected to heat. Under such circumstances, it is necessary to leave spacing d☐ that is slightly greater in order to accommodate such differential expansion.

In order to slide with as little friction as possible, each block 130 has at least one fillet 130b, preferably on the edges of each block that come into contact with the tray 120 and that extend substantially perpendicularly to the main direction of shrinkage of the preform 110 (in this example the longitudinal direction), or in other words perpendicularly to the travel direction of the blocks 130 (represented by arrows). It is also possible to envisage using blocks 130 that do not posses a horizontal wall in contact with the tray 120 but that rest on the tray solely via their vertical walls.

In addition, still for the purpose of reducing friction, a layer of powder based on yttrium oxide or on alumina may be deposited on the top surface of the tray 120 between the blocks 130 and the tray 120. This layer of powder preferably comprises grains that are substantially spherical, preferably of thickness lying in the range 10 μm to 500 μm. In general manner, it is possible to select any material for this layer, providing the material does not react with the tray or with the blocks, and providing it facilitates sliding of the blocks on the tray.

In addition, the blocks 130 may be hollow (as in the example of FIGS. 1A and 1B), or partially hollow, in order to be lighter in weight and to move in sliding with greater ease on the tray 120, which may itself be subjected to surface treatment (e.g. polishing) in order to further reduce friction between the tray 120 and the blocks 130.

Finally, adhesion between the blocks 130 and the preform 110 is minimized so that the blocks 130 can slide on the tray and so that the preform 110 can be extracted without damage after sintering has terminated. For this purpose, an anti-diffusion barrier, e.g. constituted by a layer based on yttrium oxide (e.g. in powder form) may be deposited on the surfaces 130a of the blocks that are to support the preform 110, and also on the walls of the grooves 131a in the outer blocks 131.

The preform 110 is sintered in an oven that is regulated in temperature and in pressure, with the parameters for performing such sintering depending on the material used and on the properties desired for the final part. Such parameters are known to the person skilled in the art and are not described in detail herein.

FIG. 1B shows the tooling 100 after the sintering step. During sintering, the preform 110 shrinks down to a length L2 that is shorter than its initial length L1. The difference between these two lengths (L1-L2) is written ΔL, and corresponds to the total shrinkage distance in the longitudinal direction. It is assumed at this point that the length of shrinkage in the longitudinal direction is the most significant given the appearance of the preform 110, which extends for the most part in the longitudinal direction. Nevertheless, the preform 110 shrinks with the same proportion in the transverse direction and in the vertical direction (axis Z). Shrinkage in the vertical direction is also anticipated by leaving a vertical space (visible in FIG. 1A) between the surfaces 130a and the preform 110. By way of example, the vertical space may lie in the range 0.1 mm to 5 mm depending on the shape of the part.

It can be seen that the shrinkage of the preform 110 causes the outer blocks 131 to move towards each other, and indeed causes all of the blocks 130 to move towards one another so as to occupy a second position at the end of sintering. Specifically, by shrinking, the preform 110 comes into abutment against the vertical surfaces 131b in the grooves 131a of the outer blocks 131, and causes them to move in its shrinkage direction. The central blocks 132 are pushed by the outer blocks 131 and in turn push one another progressively. As a result, the sintered vane 110' has been held and accompanied by all of the blocks 130 throughout the sintering step, and has not suffered the creep phenomenon because the surfaces 130a of the blocks 130 are now substantially in contact with the vane 110'. The blocks 130 together now define a second volume that is smaller than the first volume and that is of a shape complementary to the shape of the vane 110'.

If the sum of all of the spaces between all of the blocks 130 before sintering is written $\Sigma d\square$, then it is necessary for the inequality $\Sigma d\square \geq \Delta L$ to be satisfied in order to avoid the preform 110 being stressed at the end of sintering and being damaged. If $\Sigma d\square \approx \Delta L$, the blocks 130 will be adjacent one another at the end of sintering, however it is desirable to leave an additional margin, in particular because of possible differential thermal expansion at high temperature.

It should be observed that the spacing $d\square$ between the blocks 130 may differ between different blocks, while always ensuring that the sum $\Sigma d\square$ of these spaces complies with the above inequality. It is also possible to select a value for $d\square$ that is less than or equal to 10 mm, or indeed less than or equal to 5 mm, so as to avoid leaving suspended surfaces that are too large.

In more general manner, the acceptable spacing $d\square$ between blocks depends on the creep behavior of the preform, and in particular on its thickness and on the size of its suspended surface. For example, if the preform is fine and if the material used is very sensitive to creep, care should be taken for the spacing between the blocks to lie in the range 1 mm to 2 mm.

The tooling 200 and 300 described below is made in analogous manner to the tooling 100 described above. Certain characteristics are not repeated, since they are readily transposable from or identical to those of the above-described tooling 100.

FIGS. 2A to 2D show a second embodiment of tooling 200 of the invention in a two-dimensional configuration with a shape of rectangular type.

Figure 2A:
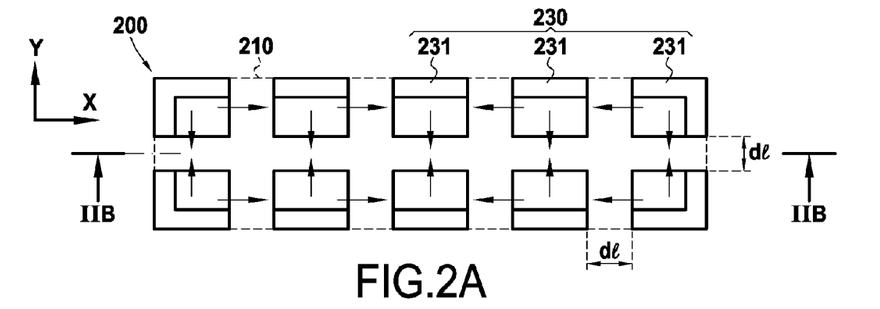
FIGS. 2A to 2D and 3A to 3D show other embodiments of the invention on the same principle as the embodiments of FIGS. 1A and 1B.
Figure 2B:
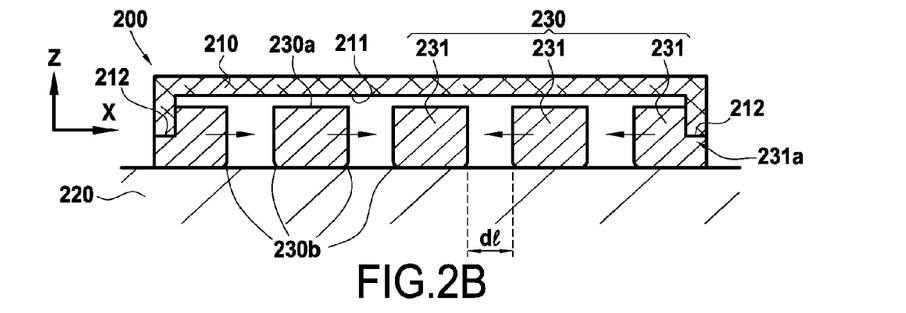

FIGS. 2A and 2B are respectively a plan view and a longitudinal section view on plane IIB of the tooling 200 before the sintering step. The tooling 200 is for supporting a preform 210 of rectangular shape that presents a suspended surface 211 extending longitudinally along an axis X and transversely along an axis Y. In accordance with the invention, the tooling 200 comprises a tray 220 surmounted by a set of blocks 230 made up in this example of two rows of outer blocks 231 that support the preform via its bearing surfaces 212, these surfaces 212 being in contact with steps 231a positioned in the blocks 231 (the steps 231a have the same function as the grooves 131a of the tooling 100).

With this shape, the preform needs to be held in the longitudinal and transverse directions in order to avoid suffering creep, which explains the use of the set of blocks 230 that is made up of two rows. It is naturally possible to envisage adding other rows of blocks, e.g. including central blocks, in a manner analogous to the above-described tooling 100.

Prior to sintering, the blocks 231 are spaced apart by spaces $d\lrcorner$ as defined above, except that there are spaces $d\square$ both along the axis X and along the axis Y. A certain amount of space along a vertical axis Z may be provided between the surfaces 230a of the blocks that are to support the preform 210 and the suspended surface 211 of the preform 210, in order to compensate for its vertical shrinkage.

The blocks 231 may have the same characteristics as the blocks of the tooling 100, and in particular they may possess fillets 230b on some of their edges in contact with the tray 220 and perpendicular to the shrinkage directions of the preform 210.

Figure 2C:
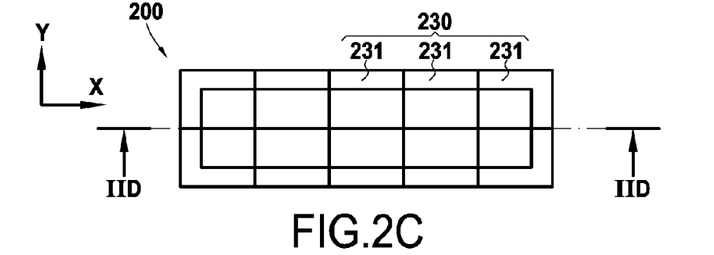
Figure 2D:
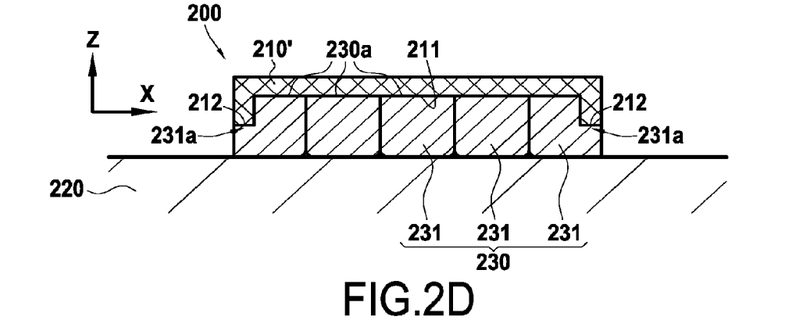

FIGS. 2C and 2D are respectively a plan view and a longitudinal section view on the plane IID of the tooling 200 after the sintering step. At the end of this step, the sintered part 210' is obtained. The preform 210 has shrunk in particular in the directions X and Y, the blocks 231 having followed its shrinking in order to prevent any creep thereof (the movements of the blocks are represented by arrows in FIGS. 2A and 2B).

FIGS. 3A to 3D show a third embodiment of tooling 300 of the invention in a two-dimensional configuration with a shape of cylindrical type (or indeed a body of revolution).

Figure 3A:
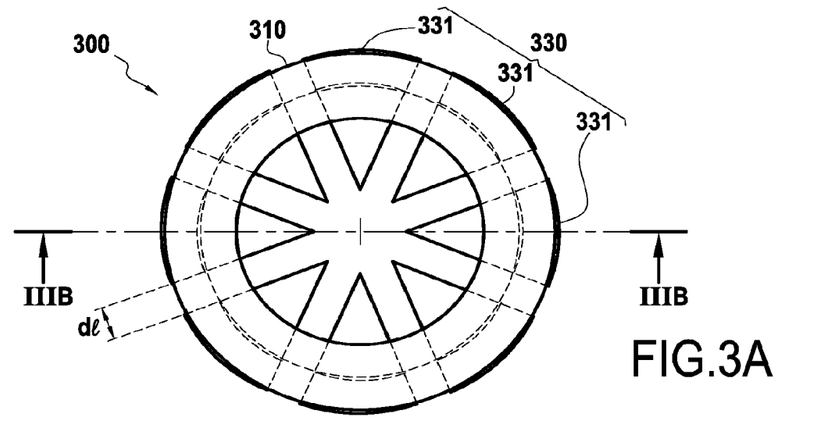
Figure 3B:
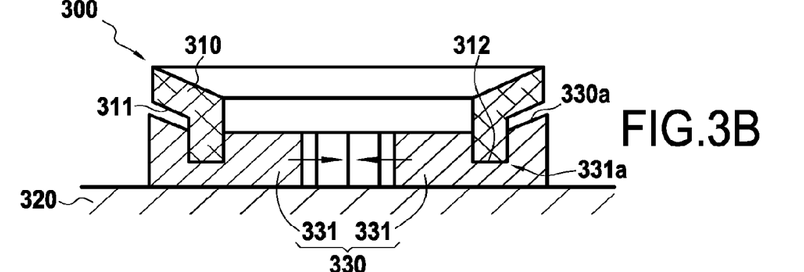

FIGS. 3A and 3B are respectively a plan view and a longitudinal section view on plane IIIB of the tooling 300 before the sintering step. The tooling 300 is to support a preform 310 in the form of a ring and presenting a cantilevered-out surface 311 at its periphery. In accordance with the invention, the tooling 300 comprises a tray 320 surmounted by a set of blocks 330 made up in this example of outer blocks 331 in the form of sectors supporting the preform via bearing surfaces 312 thereof, the bearing surfaces 312 being received in grooves 331a formed in the blocks 331.

In this example, the cantilevered-out surface 311 of the preform 310 slopes a little and is situated on the outside (relative to the center of the ring) of the bearing surface 312. Thus, the surfaces 330a of the blocks 331 for supporting the preform slope in the same manner as the surface 311.

The blocks 331 may present the same characteristics as in the tooling 100, and in particular they may have fillets (not shown in FIGS. 3A and 3B) on some of their edges making contact with the tray 320 in order to facilitate sliding.

Prior to sintering, the blocks 331 are spaced apart by spaces $d\square$ as defined in FIG. 3A, that are adapted as a function of the shrinkage of the preform 310. As above, space is conserved between these surfaces 330a and 311 in order to compensate for shrinkage along the vertical axis of the preform 310.

Figure 3C:
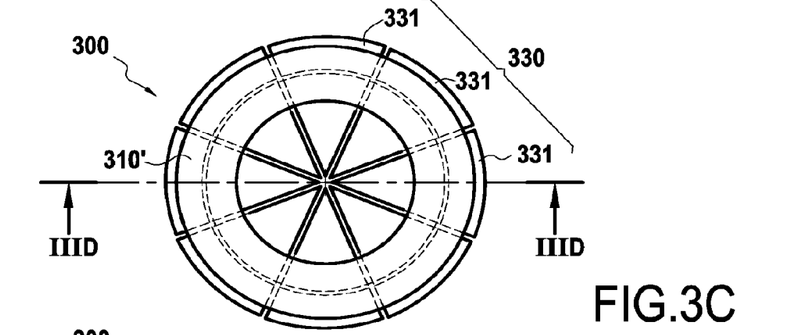
Figure 3D:
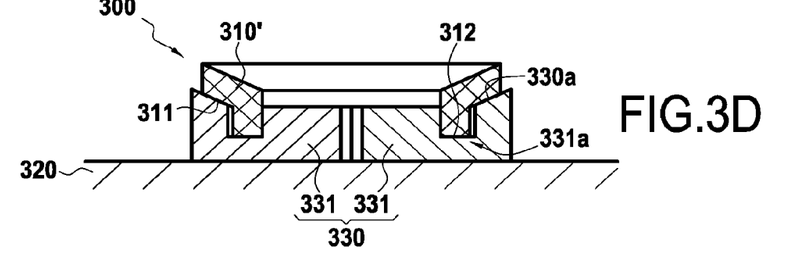

FIGS. 3C and 3D show respectively a plan view and a longitudinal section view on plane IIID of the tooling 300 after the sintering step. At the end of this step, the sintered part 310' is obtained. The preform 310 has shrunk pulling the blocks 331 towards the center of the ring, with the blocks accompanying the preform 310 as it shrinks in order to avoid creep.

Tooling of the invention is particularly adapted to fabricating an aviation turbine engine vane, as described above. As non-limiting examples, such tooling may also be used for fabricating an injector system for an aviation combustion chamber, a component of an aviation injector system, a flange, a flange system, an engine equipment support, or a cover. In general manner, the invention may be applied to fabricating parts for aviation, i.e. parts suitable for use in a turbojet for propelling an aircraft.

Other variants of tooling of the invention are described below with reference to FIGS. 4A to 8D in their application to sintering three-dimensional parts having a variety of shapes. As above, it is possible to use this tooling in other heat treatment methods at high temperature that can lead to thermomechanical deformations of the part, and in particular to shrinkage of the part.

Figure 4A:
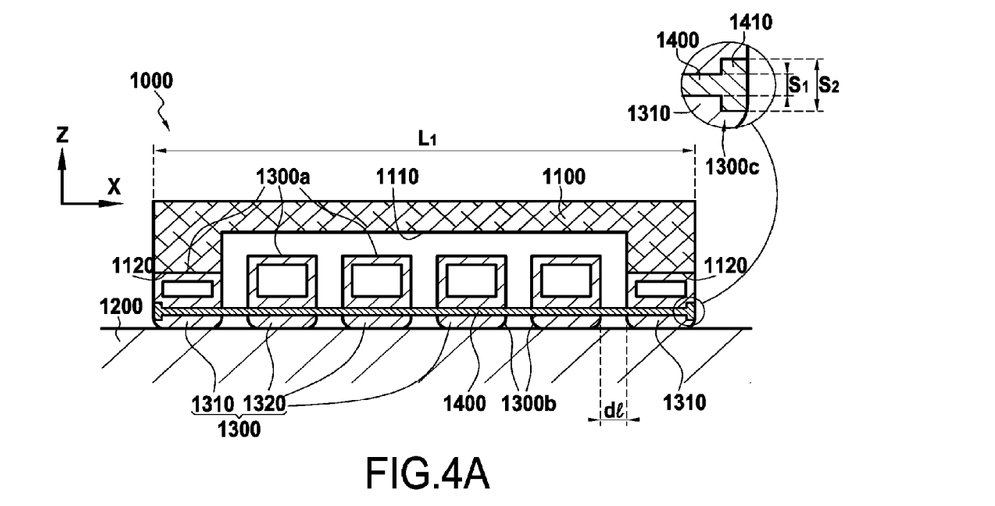
FIGS. 4A and 4B are section views of tooling in another variant embodiment of the invention, respectively in a first configuration before a sintering step and in a second configuration after a sintering step.

FIG. 4A shows tooling 1000 for supporting a preform of one-directional shape (i.e. presenting a length that is much longer than its width). In this example, the preform 1100 has a suspended surface 1110 relative to two bearing surfaces 1120 and presenting a total length L1 in its longitudinal direction (this direction extending along a horizontal axis X), the length L1 of the preform 1110 being greater than its width.

The tooling 1000 has a horizontal tray 1200 that supports a row of blocks 1300 distributed longitudinally along the axis X, the row comprising two outer blocks 1310 and four central blocks 1320.

The preform 1100 is arranged over the blocks 130 and it rests with its bearing surfaces 1120 in contact with the outer blocks 1310. Each of the blocks 1300 has at least one surface 1300*a* that is to support the preform during sintering.

In order to slide with as little friction as possible, each block 1300 presents at least one fillet 1300*b*, preferably on the edges of each block that come into contact with the tray 1200 and that are substantially perpendicular to the main shrinkage direction of the preform 110 (in this example this is the longitudinal direction X), or in other words, perpendicular to a travel direction of the blocks 1300 during sintering.

In this example, the blocks 1310 are connected together by a drive element constituted by a rod 1400 that has two abutments in the form of shoulders 1410 received in cavities 1300*c* formed in the outer blocks 131 and open to the outside. The rod 1400 also passes through the central blocks 1320 via channels pierced therethrough.

The rod 1400 comprises a metal or ceramic powder mixed with an organic binder, the powder and the binder preferably being the same as those used for the preform 1100 (and in similar proportions), examples of which are given above. The powder may represent a volume fraction that typically lies in the range 50% to 70% in the rod 1400.

The assembly constituted by the tooling 1000 and the preform 1100 may be subjected to debinding by being immersed in a solvent and then placed in a temperature-regulated oven in which debinding is finished off thermally. The assembly is then subjected to an increase in temperature so as to reach the sintering dwell temperature. The parameters for performing such sintering are known and are not described in detail herein.

Figure 4B:
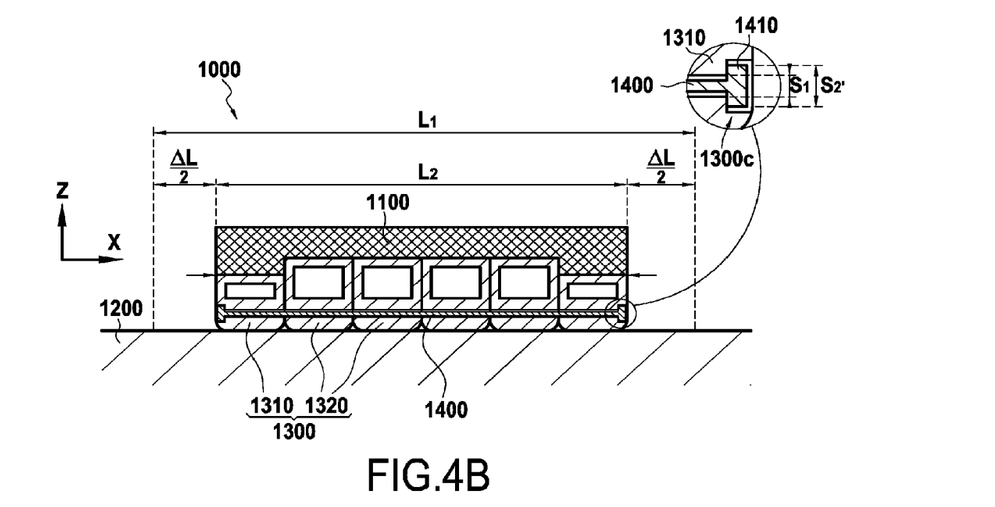

FIG. 4B shows the tooling 1000 after the sintering step. During sintering, the preform 1100 shrinks so as to reach a length L2 that is shorter than its initial length L1. As above, ΔL corresponds to the difference between these two lengths (L1-L2), which also corresponds to the total shrinkage distance in the longitudinal direction.

During sintering, the rod 1400 is also subjected to relative shrinkage identical to that of the preform 1100 since it is preferably made using the same composition (or at least the same powder). On shrinking, the rod 1400 takes the outer blocks 1310 with it, which it connects together by means of the shoulders 1410 received in the cavities 1300*c*. The shoulders 1410 and the cavities 1300*c* are positioned in such a manner as to ensure that the blocks move in a given direction, the longitudinal direction in this example. The blocks 1300 move closer together progressively following the shrinkage of the preform 1100 during sintering and at the same speed (in a variant, the speed of shrinkage of the rod may be adjusted by acting on its composition compared with the composition of the preform). As a result, the preform is accompanied during sintering, and at the end of sintering the suspended surface 1110 is supported by the blocks 1300, thereby preventing the preform 1100 creeping under its own weight. When sintering has terminated, the rods 1400 may be cut between the blocks in order to be removed therefrom.

It should be observed that the shoulders 1410 also shrink during sintering, with their section going from S2 to S2', where S2' is smaller than S2. Consequently, it is necessary for the section S2' to be greater than the section S1 of the channels pierced through the blocks 1300 so as to ensure that the rod 1400 can take the blocks with it in its shrinkage direction (the longitudinal direction in this example).

Unless mentioned to the contrary, the characteristics of the above-described tooling 1000 are easily transposable to the tooling 2000, 3000, 4000, and 5000 as described below.

Figure 5A:
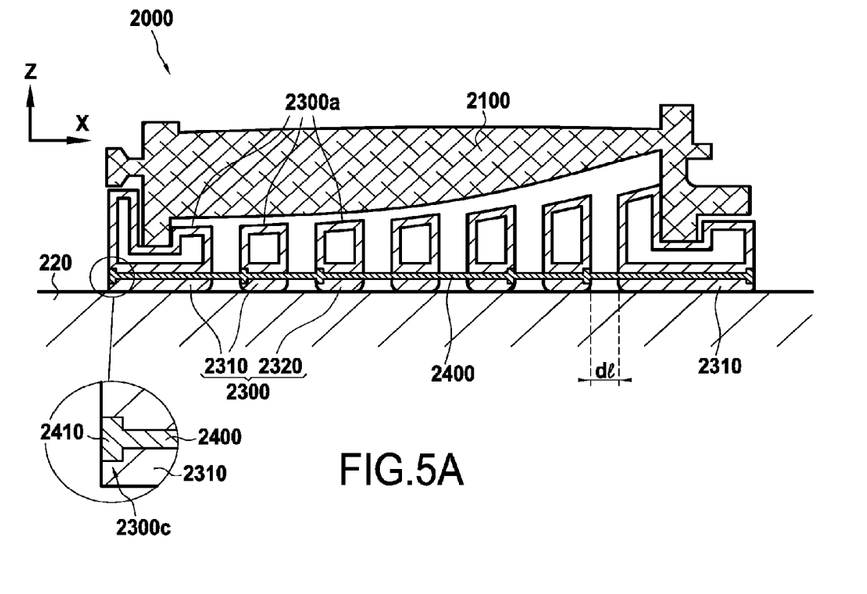
FIGS. 5A to 5B, 6A to 6D, 7A to 7D, and 8A to 8D show other embodiments of the invention on the same principle as the embodiment of FIGS. 4A and 4B.
Figure 5B:
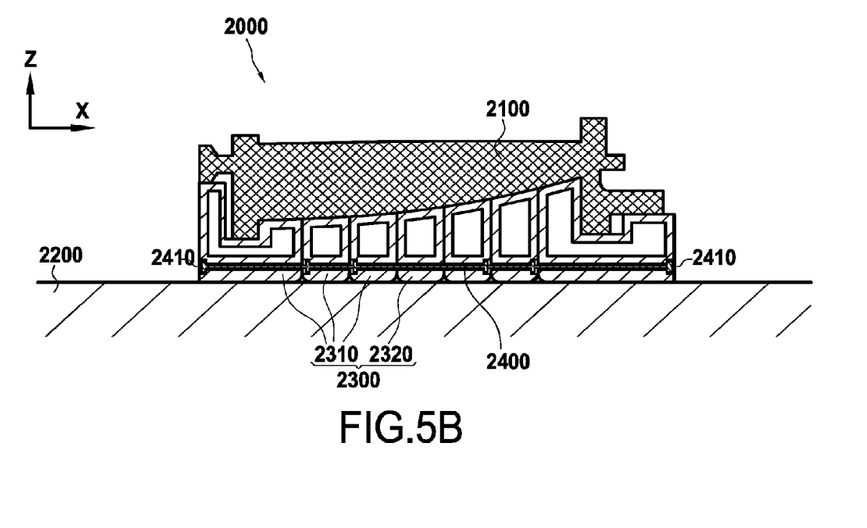

FIGS. 5A and 5B show tooling 2000 of the invention supporting an aviation vane preform 2100. In this example, the tooling 2000 comprises tray 2200 and a plurality of blocks 2300, each having a surface 2300*a* for supporting the preform 2100. Some of the blocks 2310 present cavities 2300*c* that receive the shoulders 2410 of the rod 2400. Unlike the tooling 1000, there are more than two blocks 2310 that present cavities 2300*c* (there being six in this example), and the rod 2400 presents as many shoulders 2410 as there are blocks 2310. As a result, during sintering, the blocks 2310 move substantially, coming closer to the central block 2320 (FIG. 5B) in order to accompany the shrinkage of the preform 2100. It should be observed that the central block 2320 does not have a cavity and merely has a channel passing therethrough, since it is intended to remain substantially stationary.

FIGS. 6A to 6D show another embodiment of tooling 3000 of the invention in a two-dimensional configuration with a shape of rectangular type.

Figure 6A:
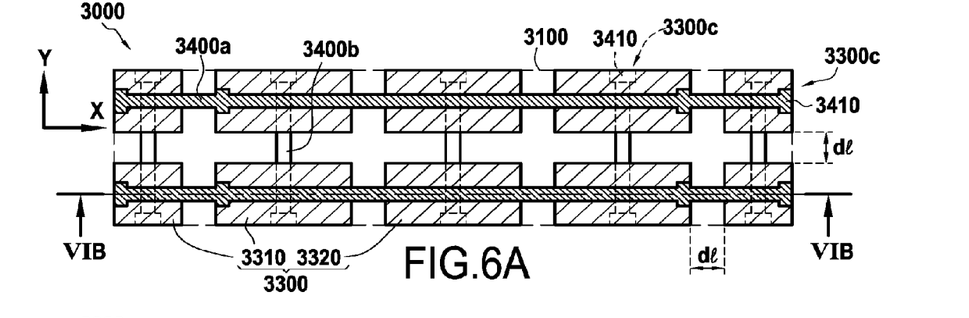
Figure 6B:
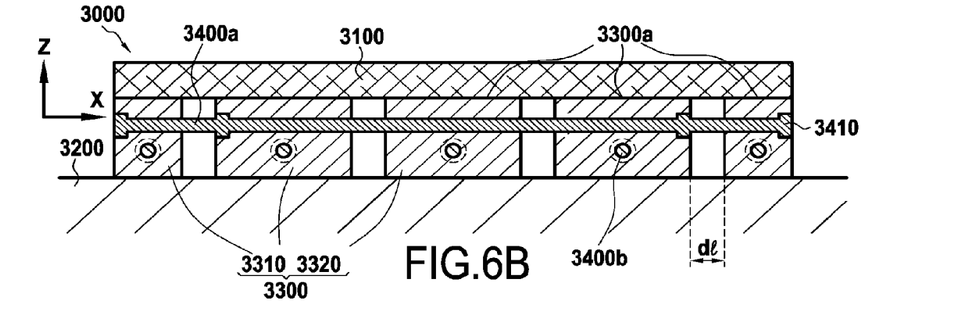
Figure 6C:
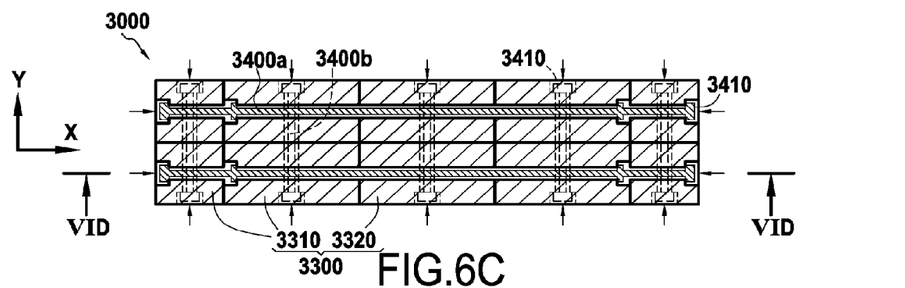
Figure 6D:
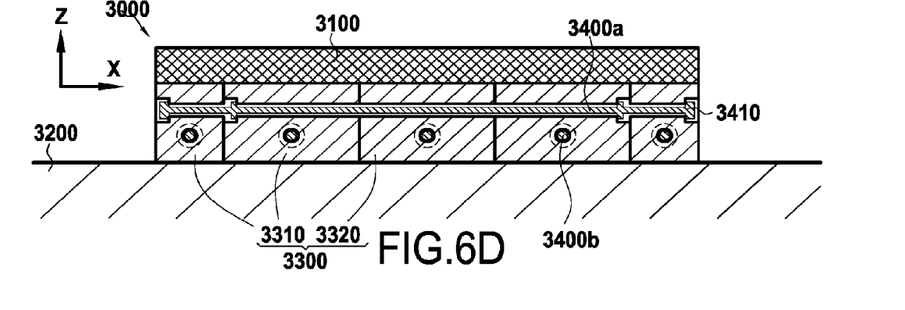

FIGS. 6A and 6B are respectively a plan view and a longitudinal section view on plane VIB of the tooling 3000 before the sintering step. The tooling 3000 is for supporting a preform 3100 of rectangular shape, in this example in the form of a plate extending along the axes X and Y. In accordance with the invention, the tooling 3000 includes a tray 3200 surmounted by a set of blocks 3300 arranged in two rows extending along the axis X, each block having a surface 3300*a* for supporting the preform.

Each block 3300 is pierced by channels that receive both a longitudinal rod 3400*a* and also a transverse rod 3400*b* perpendicular to the longitudinal rod 3400*a*. These rods 3400*a* and 3400*b* have shoulders 3410 that are received in cavities 3300*c* formed in the blocks 3300. In this example, the rods 3400*a* and 3400*b* do not meet in the blocks and they are independent.

In addition, each block 3300 has a cavity 3300*c* that receives a shoulder 3410 of a transverse rod 3400*b*, and each block 3310 also has another cavity 3300*c* that receives a shoulder of a longitudinal rod 3400*a*. It should be observed that when the number of blocks in a row is odd, the central block 3320 need not present a cavity in the longitudinal direction, and may merely have a channel passing therethrough in which the rod 3400*a* is placed (this block 3320 then does not move in the longitudinal direction, like the block 2320 in the above example). Finally, during sintering, the blocks 3310 are moved by the rods 3400*a* and 3400*b* shrinking, thereby moving the blocks towards one another in both the longitudinal and the transverse directions (FIGS. 6C and 6D) in order to accompany the shrinkage of the preform 3100.

FIGS. 7A to 7D show another embodiment of tooling 4000 of the invention in a two-dimensional configuration and having a shape of rectangular type.

Figure 7A:
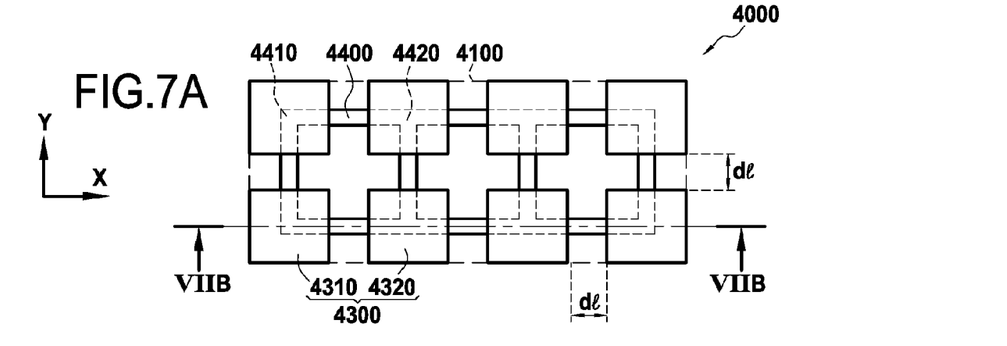
Figure 7B:
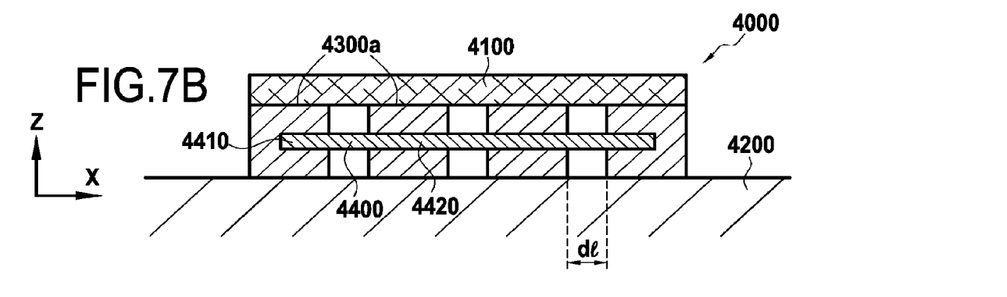

FIGS. 7A and 7B are respectively a plan view and a longitudinal section view on plane VIIB of the tooling 4000 before the sintering step. The tooling 4000 is for supporting a preform 4100 that, in this example, is in the form of a plate extending in the longitudinal and transverse directions X and Y. The tooling 4000 has a tray 4200 surmounted by a set of blocks 4300, each having a surface 4300a that is to support the preform 4100, the blocks being connected together by a drive element that in this example in the form of a trellis 4400.

Each outer block 4310 situated at one of the four corners of the tooling 4000 has an L-shaped channel 4410 opening out in two adjacent faces of the block 4310 situated facing an adjacent block. Likewise, each other block 4320 or inner block 4320 has a T-shaped channel 4420 opening out in three adjacent faces each facing an adjacent block.

Figure 7C:
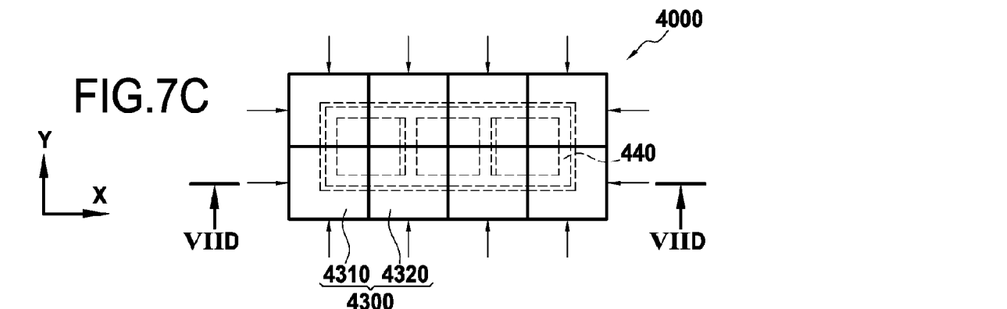
Figure 7D:
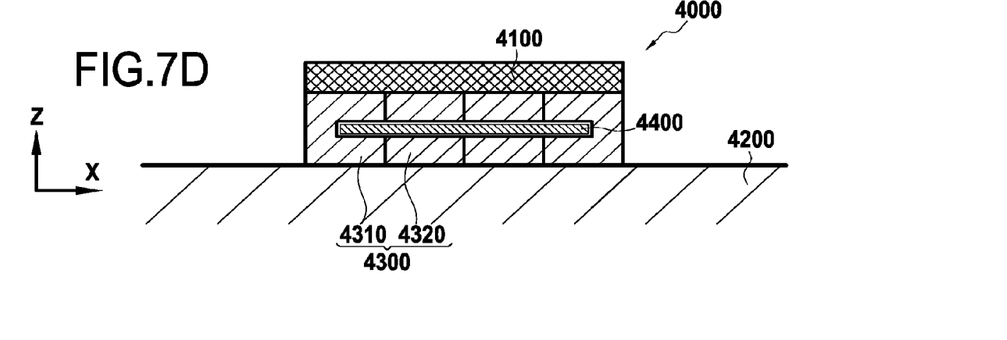

The trellis 4400 is arranged inside the above-described channels in the blocks 4300 and it connects the blocks together (an example of a method for fabricating such tooling 4000 is described below). As a result, during sintering, the trellis 4400 shrinks and takes with it the set of blocks in shrinkage directions that are both longitudinal and transverse, so that the blocks accompany the shrinkage of the preform 4100 (FIGS. 7C and 7D).

When it is desired to have tooling with more than two rows of blocks, the blocks could have perpendicular channels (forming a cross) opening out into each of the vertical faces of those blocks.

FIGS. 8A to 8D are respectively a plan view and a longitudinal section view on plane VIIIB of the tooling 5000 before the sintering step. The tooling 5000 is for supporting a ring-shaped preform 5100 presenting a cantilevered-out surface 5110 at its periphery. In accordance with the invention, the tooling 5000 includes a tray 5200 surmounted by a set of blocks 5300 in the form of sectors of a disk (there being six blocks in this example) that are for supporting the preform 5100.

Figure 8A:
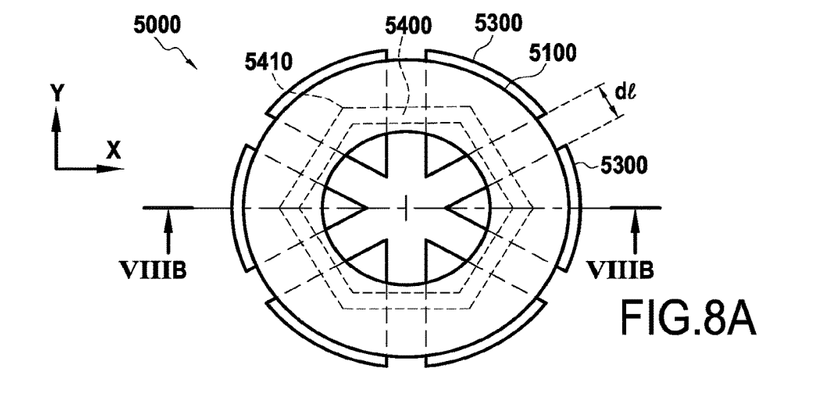
Figure 8B:
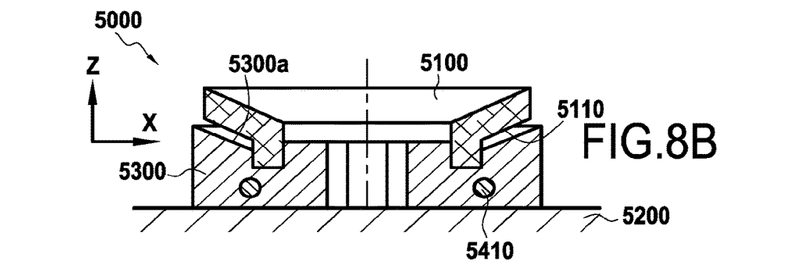

In this example, the cantilevered-out surface 5110 of the preform 5100 slopes a little and is situated on the outside (relative to the center of the ring). Thus, the surfaces 5300a of the blocks 5300 that are to support the preform slope in the same manner as the surface 5110.

Each sector 5300 has two boreholes in its vertical faces facing adjacent sectors, which boreholes meet inside the sector 5300 in order to form a channel passing through the sector. The sectors 5300 are connected together by a drive element 5400 that is polygonal in shape (having six sides in this example) and that is arranged in the channels in the sectors 5300 so that each vertex 5410 of the polygon lies inside a block 5300.

Figure 8C:
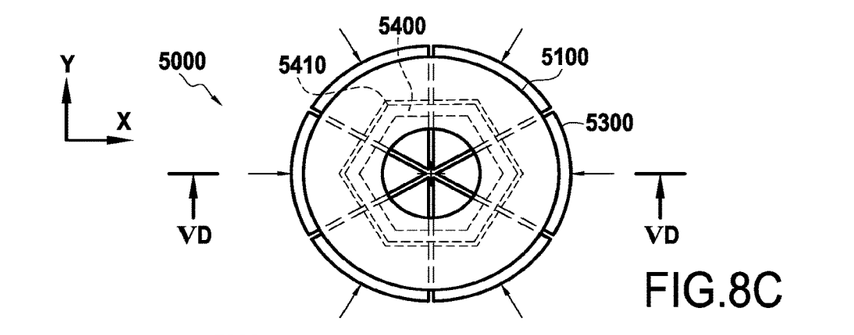
Figure 8D:
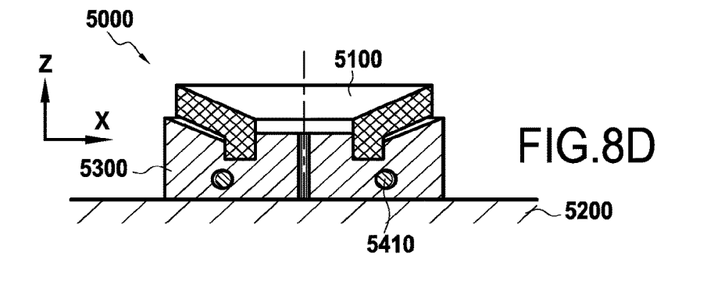

Thus, during sintering, the drive element 5400 shrinks and moves the set of blocks 5300 in its shrinkage directions, so that they accompany the shrinkage of the preform 5100 (FIGS. 8C and 8D).

There follows a description of examples of methods for fabricating tooling 1000, 2000, 3000, 4000, and 5000 provided with at least one drive element.

Figure 9A:
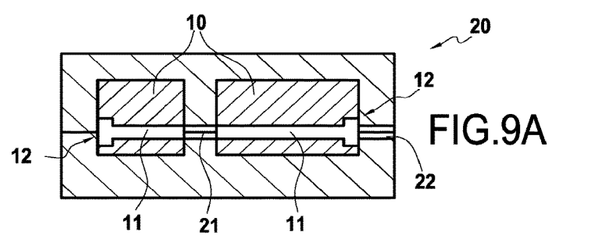
FIGS. 9A and 9B, and 10A to 10C show respectively two methods of fabricating tooling of the kind shown in FIGS. 4A to 8D.
Figure 9B:
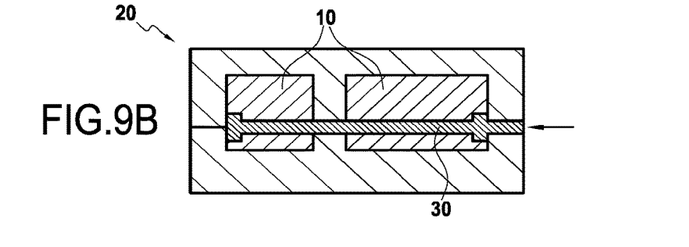

A first method of fabrication is described with reference to FIGS. 9A and 9B. This first method is suitable for fabricating tooling such as the above-described tooling 1000, 2000, 3000, 4000, and 5000.

The blocks 10 are initially machined to have the appropriate shape. Open channels 11, and where appropriate cavities 12, are made within each of the blocks.

The blocks 10 are then placed in an injection mold 20 having the same shape as the tooling that is to be made and configured to receive the blocks 10. The mold 20 also has junctions 21 connecting together the channels of the blocks. These junctions 21 are to co-operate with the channels 11 present in the blocks to form a rod 1400, 2400, 3400, a trellis 4400, or indeed a polygon 5400. Finally, the mold 20 has an inlet 22 into which there is injected a mixture comprising an organic binder and a powder.

The binder/powder mixture is injected into the temperature-regulated mold (FIG. 9B), and then cooling the mold enables the mixture to solidify. The tooling made in this way can then be unmolded and now includes a drive element 30, injection flash can be eliminated, and the tooling can be used in a heat treatment method of the invention.

Figure 10A:
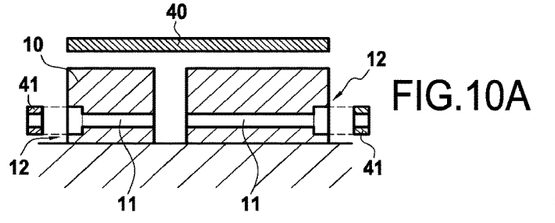
Figure 10B:
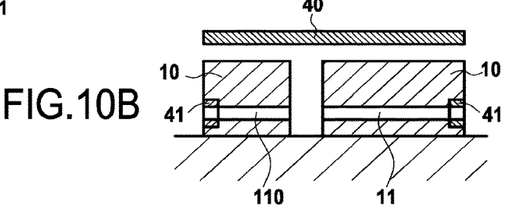
Figure 10C:
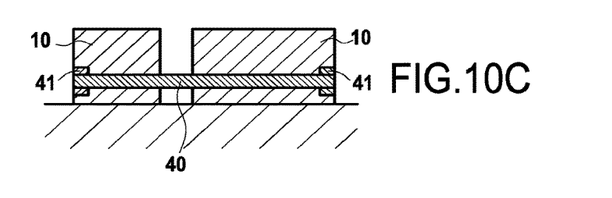

In a variant, FIGS. 10A to 10C show a second method of fabricating tooling of the invention, suitable in particular for fabricating the tooling 1000, 2000, and 3000 presenting cavities in the blocks, which cavities receive at least one rod 1400, 2400, 3400 having shoulders 1410, 2410, 3410.

As in the above method, the blocks are prepared by boring channels 11 and cavities 12. Thereafter, a rod 40 and at least two rings 41 (that are to form the shoulders 1410, 2410, 3410) are provided that are made of a mixture of a binder and a powder that is solidified (or in other words that is in a plastic state). By way of example, the rod 40 and the rings 41 may be prepared by extrusion or by injection (it is also possible to machine these parts in the plastic state). The rings 41 are inserted in the cavities 12 (FIG. 10B), and then the rod 40 is inserted in the boreholes 11 (FIG. 10C).

It should be observed that it may be advantageous to deposit an anti-diffusion layer (based on yttria or on alumina) in the channels 11 and the cavities 12 prior to inserting the rings 41 and the rod 40 therein.

The rings 41 can be assembled to the rod 40 inside the blocks 10 during the heat treatment as a result of welding/diffusion between the powders present in the rings 41 and the rod 40.

In a variant, the rings 41 can be assembled to the rod 40 in particular as a result of being put into contact in the presence of binders that provide adhesion between these elements prior to welding/diffusion.

Adhesion between the binders of the rings 41 and of the rod 40 becomes possible once these elements are heated to a temperature that is slightly greater than the melting temperature of a fraction of the binders.

It should be observed that the invention is not limited only to the above-described embodiments, and that other embodiments of the invention may naturally be envisaged, in the light of the present description, while remaining within the spirit of the invention.

The invention claimed is:
1. Tooling for supporting a preform of a three-dimensional part during heat treatment, the preform being obtained by shaping a metal or ceramic powder, the preform presenting at least one bearing surface on which it can rest and at least one suspended surface that is suspended relative to the bearing surface, the tooling comprising:
  a tray;
  a plurality of blocks arranged on the tray, all blocks of the plurality of blocks having at least one surface for supporting the preform, all blocks of the plurality of blocks being suitable for moving relative to one another by sliding on the tray between a first position in which all blocks of the plurality of blocks are spaced apart from one another and together define a first volume, and a second position in which all blocks of the plurality of blocks together define a second volume that is smaller than the first volume; and a drive element, said drive element connecting together at least some blocks of the plurality of blocks and comprising a secondary metal or ceramic powder mixed with an organic binder and suitable for shrinking under the effect of temperature so as to drive said at least some blocks of the plurality of blocks to which said drive element is connected in one or more directions corresponding to one or more shrinkage directions of said drive element.

2. The tooling according to claim 1, wherein the drive element comprises a rod provided with at least two abutments, all blocks of the plurality of blocks having respective channels passing therethrough in which the rod is arranged, the rod being configured so that the abutments bear against at least two blocks of the plurality of blocks when the rod shrinks in order to drive them in the shrinkage direction of the rod.

3. The tooling according to claim 1, further comprising a second drive element connected to at least some blocks of the plurality of blocks, said drive element and said second drive element each extending in a different direction.

4. The tooling according to claim 1, wherein all blocks of the plurality of blocks are hollow, at least in part.

5. The tooling according to claim 1, wherein each block of the plurality of blocks includes a fillet formed on at least one of the edges of said block that comes into contact with the tray.

6. The tooling according to claim 1, wherein all blocks of the plurality of blocks are made of a ceramic material selected from the following materials: zirconia; alumina; yttria; silicon dioxide; silicon nitride (Si3N4); a mixture of ceramics; or a metal alloy selected from the following alloys: a molybdenum-based alloy; a cobalt-based alloy; a nickel-based alloy; an iron-based alloy; a titanium-based alloy; and an aluminum-based alloy.

7. The tooling according to claim 1, further comprising a layer of alumina or yttrium oxide powder on the top surface of the tray.

8. The tooling according to claim 1, further comprising an anti-diffusion barrier based on yttrium oxide on the surfaces of all blocks of the plurality of blocks that are to support the preform.

9. The tooling according to claim 1, wherein the top surface of the tray is polished.

* * * * *